(12) United States Patent
Kimes

(10) Patent No.: US 9,255,614 B2
(45) Date of Patent: Feb. 9, 2016

(54) ELECTRONIC VEHICULAR TRANSMISSION AND COUPLING AND CONTROL ASSEMBLY FOR USE THEREIN

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 14/675,840

(22) Filed: Apr. 1, 2015

(65) Prior Publication Data
US 2015/0204390 A1    Jul. 23, 2015

Related U.S. Application Data

(63) Continuation-in-part of application No. 14/288,819, filed on May 28, 2014, and a continuation-in-part of application No. 13/992,785, filed as application No. PCT/US2011/036634 on May 16, 2011, now Pat. No.
(Continued)

(51) Int. Cl.
*B01D 1/00*     (2006.01)
*F16D 27/09*    (2006.01)
(Continued)

(52) U.S. Cl.
CPC ............... *F16D 27/09* (2013.01); *F16D 27/00* (2013.01); *F16D 27/10* (2013.01); *F16D 41/02* (2013.01); *F16D 41/12* (2013.01); *F16D 41/125* (2013.01); *F16D 41/14* (2013.01); *F16D 2300/18* (2013.01)

(58) Field of Classification Search
CPC ....... F16D 27/09; F16D 41/125; F16D 41/00; F16D 41/12; F16D 27/00; F16D 27/14; F16D 2300/18
See application file for complete search history.

(56) References Cited

U.S. PATENT DOCUMENTS 2,960,287 A    11/1960   Barlow
3,130,989 A    4/1964    Lannen
(Continued)

FOREIGN PATENT DOCUMENTS

GB    1007475 A    10/1965

OTHER PUBLICATIONS

International Search Report and Written Opinion; International application No. PCT/US2011/036634; date of mailing Aug. 25, 2011.
(Continued)

*Primary Examiner* — David J Hlavka
(74) *Attorney, Agent, or Firm* — Brooks Kushman P.C.

(57) ABSTRACT

An electronic vehicular transmission and a coupling and control assembly for use herein are provided. A case of the transmission has an environment hostile to electrical components during use of the transmission. A coupling member supported for rotation within the case has a coupling face oriented to face radially with respect to a rotational axis. The transmission also includes an electromechanical component capable of operating in the environment. The component includes a mechanical locking element, at least one excitation coil and electrical wiring to supply electrical power to the at least one excitation coil from a power source outside the environment. The component is mounted to and extends into the environment of the case so that the locking element is in close-spaced opposition to the coupling face and the wiring is segregated from the environment to resist long-term, hot temperature embrittlement and fragmentation of insulation on the wiring.

9 Claims, 7 Drawing Sheets

Related U.S. Application Data 9,109,636, application No. 14/675,840, filed on Apr. 1, 2015, which is a continuation-in-part of application No. 14/300,275, filed on Jun. 10, 2014, now Pat. No. 9,127,724.

(60) Provisional application No. 61/941,741, filed on Feb. 19, 2014, provisional application No. 61/870,434, filed on Aug. 27, 2013, provisional application No. 61/421,856, filed on Dec. 10, 2010, provisional application No. 61/870,434, filed on Aug. 27, 2013.

(51) Int. Cl.

| | |
|---|---|
| *F16D 27/00* | (2006.01) |
| *F16D 41/12* | (2006.01) |
| *F16D 27/10* | (2006.01) |
| *F16D 41/02* | (2006.01) |
| *F16D 41/14* | (2006.01) |

(56) References Cited

U.S. PATENT DOCUMENTS

| | | | |
|---|---|---|---|
| 4,050,560 A | 9/1977 | Torstenfelt | |
| 4,056,747 A | 11/1977 | Orris et al. | |
| 4,200,002 A | 4/1980 | Takahashi | |
| 4,340,133 A | 7/1982 | Blersch | |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,449,057 A | 9/1995 | Frank | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,806,643 A | 9/1998 | Fitz | |
| 5,847,469 A | 12/1998 | Tabata et al. | |
| 5,856,709 A | 1/1999 | Ibaraki et al. | |
| 5,871,071 A | 2/1999 | Sink | |
| 5,898,249 A * | 4/1999 | Boggs, III ............... | F16D 27/09 192/84.1 |
| 5,918,715 A | 7/1999 | Ruth et al. | |
| 5,927,455 A | 7/1999 | Baker et al. | |
| 5,954,174 A | 9/1999 | Costin | |
| 5,964,331 A | 10/1999 | Reed et al. | |
| 5,979,627 A | 11/1999 | Ruth et al. | |
| 6,019,699 A | 2/2000 | Hoshiya et al. | |
| 6,065,576 A | 5/2000 | Shaw et al. | |
| 6,075,302 A | 6/2000 | McCleer | |
| 6,116,394 A | 9/2000 | Ruth | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,237,931 B1 | 5/2001 | Marola | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,386,349 B1 | 5/2002 | Welch | |
| 6,481,551 B1 | 11/2002 | Ruth | |
| 6,503,167 B1 | 1/2003 | Sturm | |
| 6,505,721 B1 | 1/2003 | Welch | |
| 6,571,926 B2 | 6/2003 | Pawley | |
| 6,814,201 B2 | 11/2004 | Thomas | |
| 6,817,459 B1 * | 11/2004 | Le ............... | F16D 27/112 192/84.961 |
| 6,846,257 B2 | 1/2005 | Baker et al. | |
| 6,854,577 B2 | 2/2005 | Ruth | |
| 6,953,409 B2 | 10/2005 | Schmidt et al. | |
| 6,982,502 B1 | 1/2006 | Sendaula et al. | |
| 7,025,188 B2 | 4/2006 | Lindenschmidt et al. | |
| 7,093,512 B2 | 8/2006 | Ibamoto et al. | |
| 7,100,756 B2 | 9/2006 | Kimes et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,383,930 B2 | 6/2008 | Kimes et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,661,518 B2 | 2/2010 | Kimes | |
| 7,690,455 B2 | 4/2010 | Kano et al. | |
| 7,690,492 B2 | 4/2010 | Gooden et al. | |
| 7,806,795 B2 | 10/2010 | Oba et al. | |
| 7,942,781 B2 | 5/2011 | Kimes | |
| 8,007,396 B2 | 8/2011 | Kimes et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,187,141 B2 | 5/2012 | Goleski et al. | |
| 8,196,724 B2 | 6/2012 | Samie et al. | |
| 8,272,488 B2 | 9/2012 | Eisengruber et al. | |
| 8,286,772 B2 | 10/2012 | Eisengruber | |
| 8,324,890 B2 | 12/2012 | Lin | |
| 8,418,825 B2 | 4/2013 | Bird | |
| 8,491,439 B2 | 7/2013 | Kimes | |
| 8,491,440 B2 | 7/2013 | Kimes et al. | |
| 8,720,659 B2 | 5/2014 | Pawley | |
| 8,813,929 B2 | 8/2014 | Kimes | |
| 2002/0000724 A1 | 1/2002 | Kalargeros et al. | |
| 2003/0126870 A1 * | 7/2003 | Meckstroth ......... | B60H 1/3222 62/133 |
| 2004/0159517 A1 | 8/2004 | Thomas | |
| 2004/0216975 A1 | 11/2004 | Ruth | |
| 2005/0279602 A1 | 12/2005 | Ruth | |
| 2006/0021838 A1 | 2/2006 | Kimes et al. | |
| 2006/0124425 A1 | 6/2006 | Fetting, Jr. et al. | |
| 2006/0138777 A1 | 6/2006 | Hofbauer et al. | |
| 2006/0185957 A1 | 8/2006 | Kimes et al. | |
| 2006/0249345 A1 | 11/2006 | Ruth | |
| 2007/0056825 A1 | 3/2007 | Fetting, Jr. et al. | |
| 2007/0107960 A1 | 5/2007 | Takami et al. | |
| 2007/0278061 A1 | 12/2007 | Wittkopp et al. | |
| 2008/0093190 A1 | 4/2008 | Belmont | |
| 2008/0110715 A1 | 5/2008 | Pawley | |
| 2008/0135369 A1 | 6/2008 | Meier | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0188338 A1 | 8/2008 | Kimes et al. | |
| 2008/0223681 A1 | 9/2008 | Stevenson et al. | |
| 2008/0245360 A1 | 10/2008 | Almy et al. | |
| 2009/0062058 A1 | 3/2009 | Kimes et al. | |
| 2009/0084653 A1 | 4/2009 | Holmes | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |

(56) References Cited

U.S. PATENT DOCUMENTS

| | | |
|---|---|---|
| 2009/0233755 A1 | 9/2009 | Kimes |
| 2009/0255773 A1 | 10/2009 | Seufert et al. |
| 2009/0266667 A1* | 10/2009 | Samie .................... F16D 41/12 192/43.1 |
| 2010/0071497 A1 | 3/2010 | Reisch et al. |
| 2010/0105515 A1 | 4/2010 | Goleski et al. |
| 2010/0127693 A1 | 5/2010 | Wenzel et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0147159 A1* | 6/2011 | Kuehl ..................... F16D 1/10 192/30 R |
| 2011/0233026 A1 | 9/2011 | Pawley |
| 2012/0021862 A1 | 1/2012 | Isken, II et al. |
| 2012/0145505 A1 | 6/2012 | Kimes |
| 2012/0149518 A1 | 6/2012 | Kimes |
| 2012/0152683 A1 | 6/2012 | Kimes |
| 2012/0152687 A1 | 6/2012 | Kimes et al. |
| 2012/0228076 A1 | 9/2012 | Tate, Jr. et al. |
| 2013/0062151 A1 | 3/2013 | Pawley |
| 2013/0277164 A1 | 10/2013 | Prout et al. |
| 2014/0102844 A1 | 4/2014 | Greene et al. |
| 2014/0190785 A1 | 7/2014 | Fetting et al. |
| 2014/0238811 A1* | 8/2014 | Heuver .................. F16D 27/09 192/84.92 |
| 2014/0284167 A1 | 9/2014 | Kimes |
| 2014/0305761 A1 | 10/2014 | Kimes |
| 2015/0000442 A1 | 1/2015 | Kimes et al. |
| 2015/0060225 A1* | 3/2015 | Kimes .................... F16D 27/02 192/69 |

OTHER PUBLICATIONS

International Preliminary Report on Patentability; International application No. PCT/US2011/036634; date of issuance of report Jun. 12, 2013.

International Search Report and Written Opinion; International application No. PCT/US12/050742; date of mailing Nov. 20, 2012.

Official Action; corresponding U.S. Appl. No. 13/992,785, filed Jun. 10, 2013.

International Search Report and Written Opinion; International application No. PCT/US2014/041631; date of mailing Oct. 9, 2014.

International Search Report and Written Opinion; International application No. PCT/US2014/049044; date of mailing Nov. 24, 2014.

Notice of Allowance and Issue Fee Due; corresponding U.S. Appl. No. 13/992,785; date of mailing Jan. 30, 2015.

* cited by examiner

ELECTRONIC VEHICULAR TRANSMISSION AND COUPLING AND CONTROL ASSEMBLY FOR USE THEREIN

CROSS-REFERENCE TO RELATED APPLICATIONS

This application is a continuation-in-part of U.S. application Ser. No. 14/288,819 filed May 28, 2014, now pending, which claims benefit of U.S. provisional application Ser. No. 61/941,741 filed Feb. 19, 2014 and claims benefit of U.S. provisional application Ser. No. 61/870,434 filed Aug. 27, 2013; this application is also a continuation-in-part of U.S. application Ser. No. 13/992,785 filed Jun. 10, 2013 which is a 371 of PCT/US2011/036634 filed May 16, 2011, which claims benefit of U.S. provisional application Ser. No. 61/421,856 filed Dec. 10, 2010. This application is also a continuation-in-part of U.S. application Ser. No. 14/300,275 filed Jun. 10, 2014 which claims benefit of U.S. provisional application Ser. No. 61/870,434 filed Aug. 27, 2013.

TECHNICAL FIELD

This invention generally relates to electronic vehicular transmissions and coupling and control assemblies for use in such transmissions.

Overview

Coupling assemblies such as clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission. U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

In a powershift transmission, tip-in clunk is one of most difficult challenges due to absence of a torque converter. When the driver tips-in, i.e., depresses the accelerator pedal following a coast condition, gear shift harshness and noise, called clunk, are heard and felt in the passenger compartment due to the mechanical linkage, without a fluid coupling, between the engine and powershift transmission input. Tip-in clunk is especially acute in a parking-lot maneuver, in which a vehicle coasting at low speed is then accelerated in order to maneuver into a parking space.

In order to achieve good shift quality and to eliminate tip-in clunk, a powershift transmission should employ a control strategy that is different from that of a conventional automatic transmission. The control system should address the unique operating characteristics of a powershift transmission and include remedial steps to avoid the objectionable harshness yet not interfere with driver expectations and performance requirements of the powershift transmission. There is a need to eliminate shift harshness and noise associated with tip-in clunk in a powershift transmission.

For purposes of this disclosure, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Some U.S. patents related to the present invention include: U.S. Pat. Nos. 4,056,747; 5,052,534; 5,070,978; 5,449,057; 5,486,758; 5,678,668; 5,806,643; 5,871,071; 5,918,715;

5,964,331; 5,979,627; 6,065,576; 6,116,394; 6,125,980; 6,129,190; 6,186,299; 6,193,038; 6,386,349; 6,481,551; 6,505,721; 6,571,926; 6,814,201; 7,153,228; 7,275,628; 8,051,959; 8,196,724; and 8,286,772.

Yet still other related U.S. patents include: U.S. Pat. Nos. 4,200,002; 5,954,174; and 7,025,188.

U.S. Pat. No. 6,854,577 discloses a sound-dampened, one-way clutch including a plastic/steel pair of struts to dampen engagement clunk. The plastic strut is slightly longer than the steel strut. This pattern can be doubled to dual engaging. This approach has had some success. However, the dampening function stopped when the plastic parts became exposed to hot oil over a period of time.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a science called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

Other U.S. patent documents related to at least one aspect of the present invention includes U.S. Pat. Nos. 8,813,929; 8,491,440; 8,491,439; 8,286,772; 8,272,488; 8,187,141; 8,079,453; 8,007,396; 7,942,781; 7,690,492; 7,661,518; 7,455,157; 7,455,156; 7,451,862; 7,448,481; 7,383,930; 7,223,198; 7,100,756; and 6,290,044; and U.S. published application Nos. 2015/0000442; 2014/0305761; 2013/0277164; 2013/0062151; 2012/0152683; 2012/0149518; 2012/0152687; 2012/0145505; 2011/0233026; 2010/0105515; 2010/0230226; 2009/0233755; 2009/0062058; 2009/0211863; 2008/0110715; 2008/0188338; 2008/0185253; 2006/0124425; 2006/0249345; 2006/0185957; 2006/0021838, 2004/0216975; and 2005/0279602.

Some other U.S. patent documents related to at least one aspect of the present invention includes U.S. Pat. Nos. 8,720,659; 8,418,825; 5,996,758; 4,050,560; 8,061,496; 8,196,724; and U.S. published application Nos. 2014/0190785; 2014/0102844; 2014/0284167; 2012/0021862; 2012/0228076; 2004/0159517; and 2010/0127693.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMC) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing element) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

During use, a vehicular transmission creates a hot oil environment which can cause long term embrittlement of connector and wire insulation as well as contaminants in oil which short electrical circuits or components.

SUMMARY OF EXAMPLE EMBODIMENTS OF THE INVENTION

An object of at least one embodiment of the present invention is to provide an electronic vehicular transmission and a coupling and control assembly for use in the transmission wherein an electromechanical component of the assembly is protected from a hostile environment which the transmission creates during use.

In carrying out the above object and other objects of at least one embodiment of the present invention, an electronic vehicular transmission is provided which includes a transmission case having an environment hostile to electrical components. The transmission also includes a coupling member supported for rotation within the environment about a rotational axis. The coupling member has a coupling face oriented to face radially with respect to the axis and has a set of locking formations. An electromechanical component is capable of operating in the environment. The component includes a mechanical locking element, at least one excitation coil and electrical wiring to supply electrical power to the at least one excitation coil from a power source outside the environment. The component is mounted to and extends into the environment of the case so that the locking element is in close-spaced opposition to the coupling face and the wiring is segregated from the environment to resist long-term, hot temperature embrittlement and fragmentation of insulation on the wiring. The locking element is movable across a gap towards the coupling face to a coupling position in response to the at least one excitation coil receiving electrical power. The locking element abuttingly engages one of the locking formations to prevent rotation of the coupling member in one direction about the axis in the coupling position.

The at least one excitation coil may be potted to segregate the at least one excitation coil from the environment.

The transmission may further include an overmolded connector mounted on the component. The wiring extends through the connector from outside the environment to the at least one excitation coil. The connector is located outside the environment to resist hot temperature, long-term embrittlement and fragmentation of the connector.

Further in carrying out the above object and other objects of at least one embodiment of the present invention, an electronic vehicular transmission is provided which includes a transmission case having an environment hostile to electrical components. The transmission includes a controllable coupling assembly having first and second coupling members mounted for rotation relative to one another about a rotational axis. The first coupling member has a first coupling face oriented to face axially in a first direction with respect to the axis and the second coupling member has a second coupling face oriented to face axially in a second direction opposite the first direction with respect to the axis. The second coupling member has a third coupling face oriented to face radially with respect to the axis and has a set of locking formations. The transmission further includes an electromechanical component capable of operating in the environment. The component includes a mechanical locking element, at least one excitation coil and electrical wiring to supply electrical power to the at least one excitation coil from a power source outside the environment. The component is mounted to and extends into the environment of the case so that the locking element is in close-spaced opposition to the third coupling face and the wiring is segregated from the environment to resist long-term, hot temperature embrittlement and fragmentation of insulation on the wiring. The locking element is movable across a gap toward the third coupling face to a coupling position in response to the at least one excitation coil receiving electrical power. The locking element abuttingly engages one of the locking formations to prevent rotation of the second coupling member in one direction about the axis in the coupling position.

The at least one excitation coil may be potted to segregate the at least one excitation coil from the environment.

The transmission may further include an overmolded connector mounted on the component. The wiring extends to the connector from outside the environment to the at least one excitation coil. The connector is located outside the environment to resist hot temperature, long-term embrittlement and fragmentation of the connector.

Still further in carrying out the above object and other objects of at least one embodiment of the present invention, a coupling and control assembly is provided and includes a coupling member supported for rotation about a rotational axis. The coupling member has a coupling face oriented to face radially with respect to the axis and has a set of locking formations. The assembly also includes an electromechanical component having a mechanical locking element, at least excitation coil and electrical wiring to supply electrical power to the at least one excitation coil from a power source. The component is positioned relative to the coupling member so that the locking element is in close-spaced opposition to the coupling face and the wiring is segregated from the coupling member. The locking element is movable across a gap towards the coupling face to a coupling position in response to the at least one excitation coil receiving electrical power. The locking element abuttingly engages one of the locking formations to prevent rotation of the coupling member in one direction about the axis in the coupling position.

The at least one excitation coil may be potted to segregate the at least one excitation coil from the coupling member.

The assembly may further include an overmolded connector mounted on the component. The wiring extends through the connector to the at least one excitation coil.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
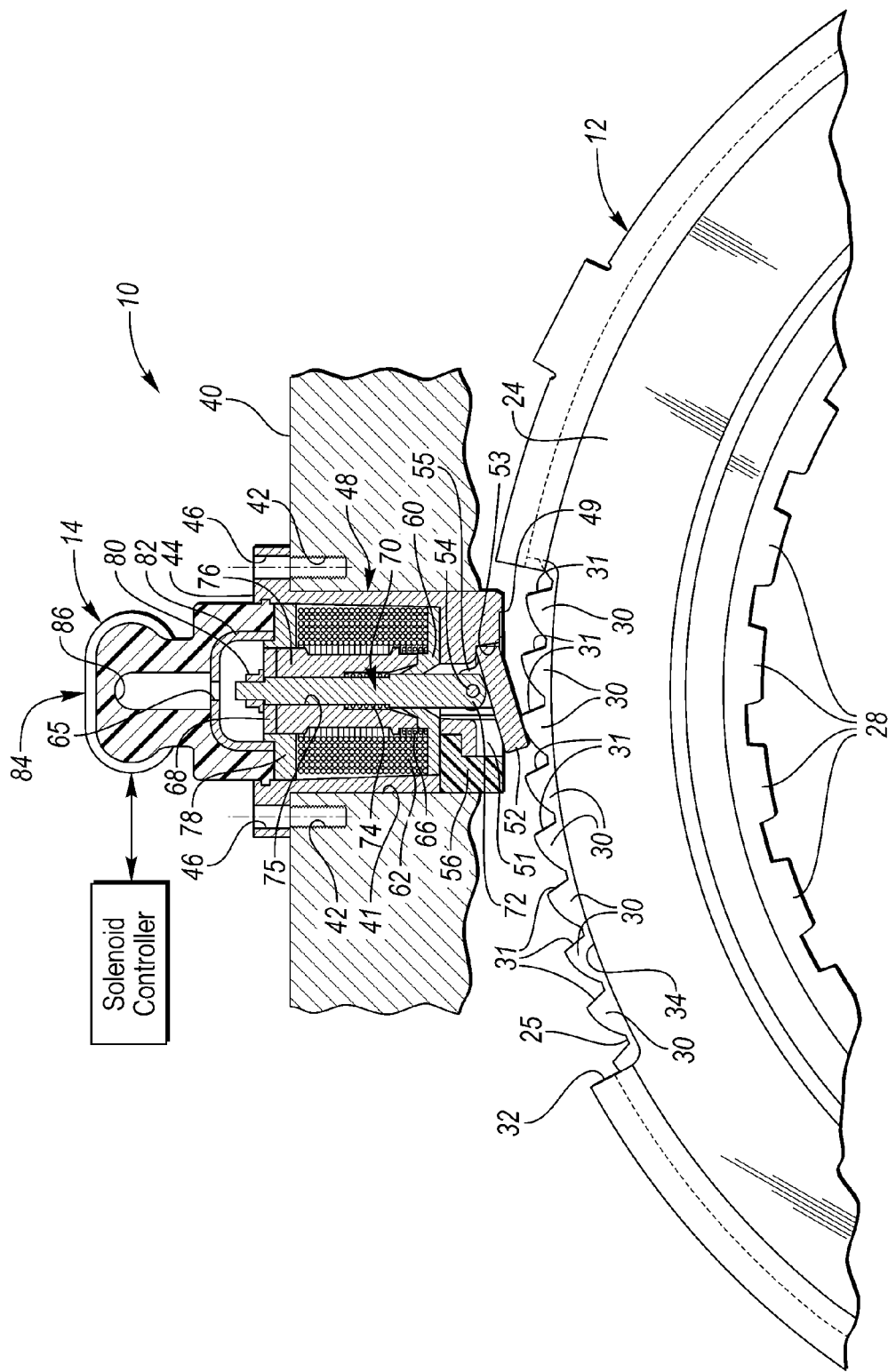
FIG. 5 is a partial block diagram and side view, opposite the side view of FIG. 4, but with one of the components in cross section and inserted in a case (also in cross section) of an electronic vehicle transmission constructed in accordance with at least one embodiment of the present invention.
Figure 6:
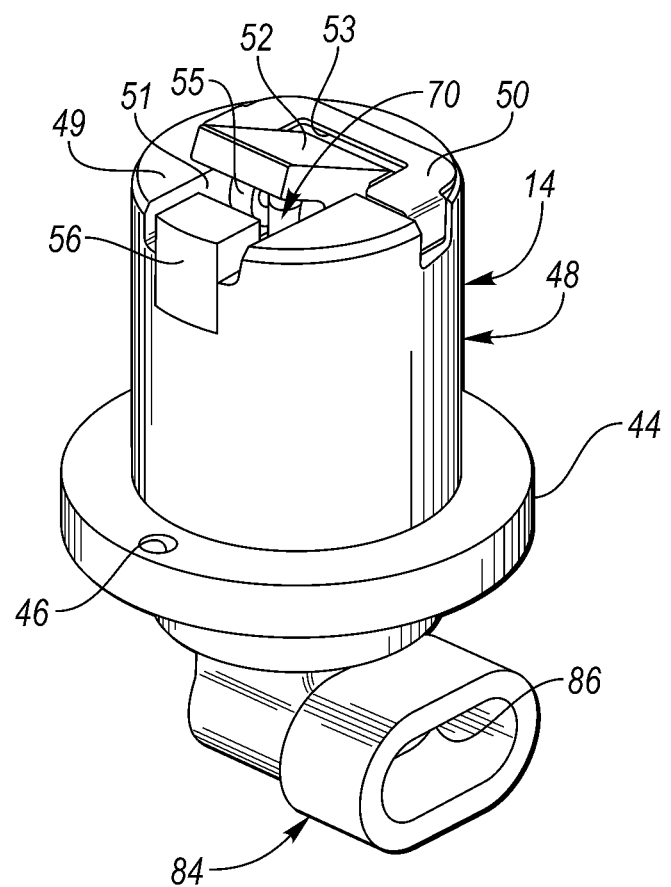
FIG. 6 is a perspective, schematic bottom view of the electromechanical component of the prior Figures.

Referring now to the drawing figures, there is illustrated one embodiment of an electronic vehicular transmission, generally indicated at 10 in FIG. 5. The transmission 10 includes a transmission case 40 having a bore 41 which extends completely through the case 40. As is well known in the art, the transmission case 40 has associated therewith an environment which is hostile to electrical components during use of the transmission 10 primarily because of: (1) hot oil contained therein, (2) contaminants in the oil which cause shorting of any electrical circuits therein and (3) vibration.

The transmission 10 also includes an electromechanical component, generally indicated at 14, which is capable of operating in the hostile environment of the case 40. The component 14 may be referred to herein below as an SSI (i.e. selectable solenoid insert). The component 14 is inserted through the bore 41 and held therein by threaded fasteners (not shown) which extend through holes 46 formed through an annular flange 44 of a housing, generally indicated at 48, of the component 14. The fasteners extend into threshold holes 42 formed in the case 40 about the bore 41 to secure the component 14 to the case 40.

Figure 1:
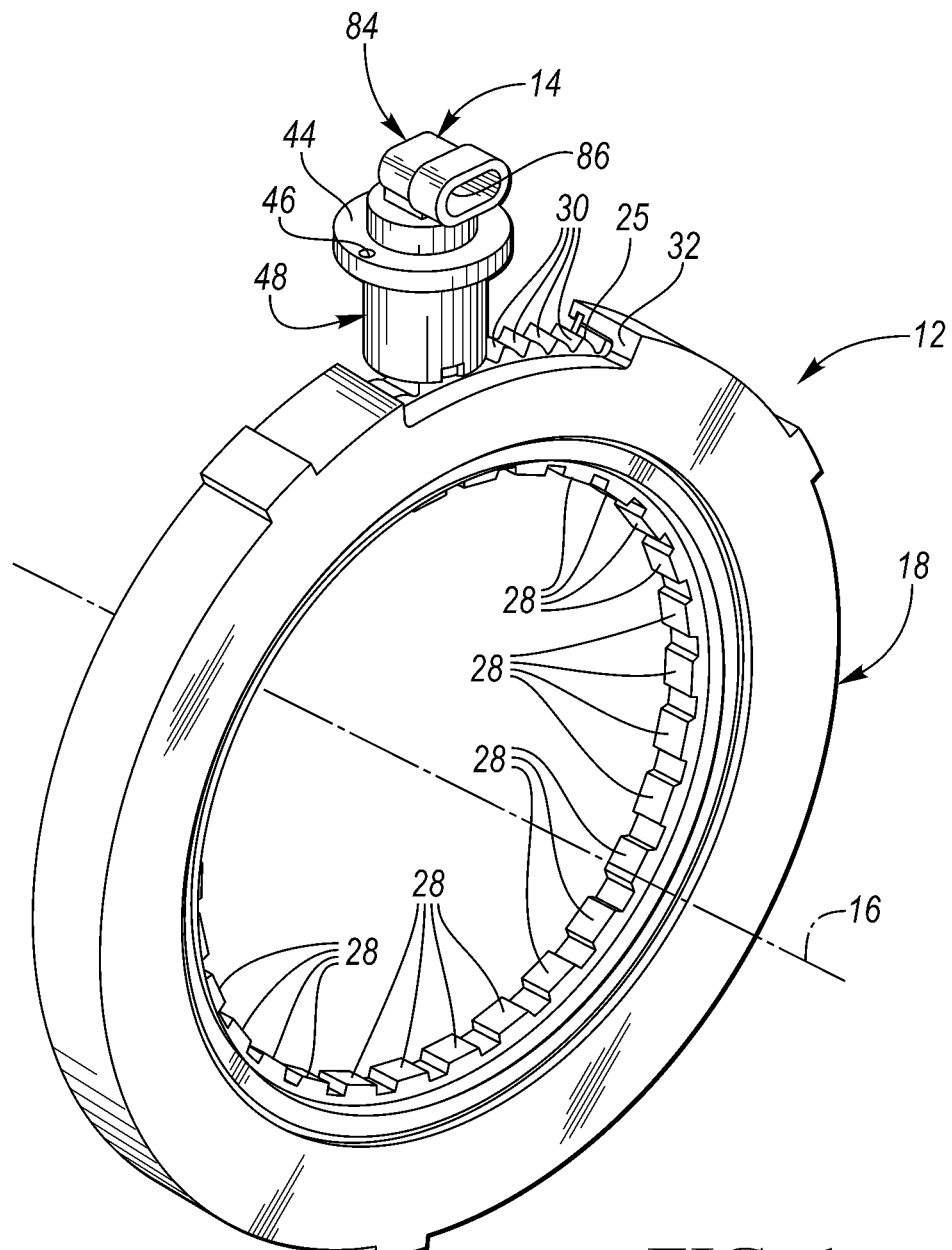
FIG. 1 is a schematic, perspective view of a controllable coupling assembly and an electromechanical component constructed in accordance with at least one embodiment of the present invention.
Figure 2:
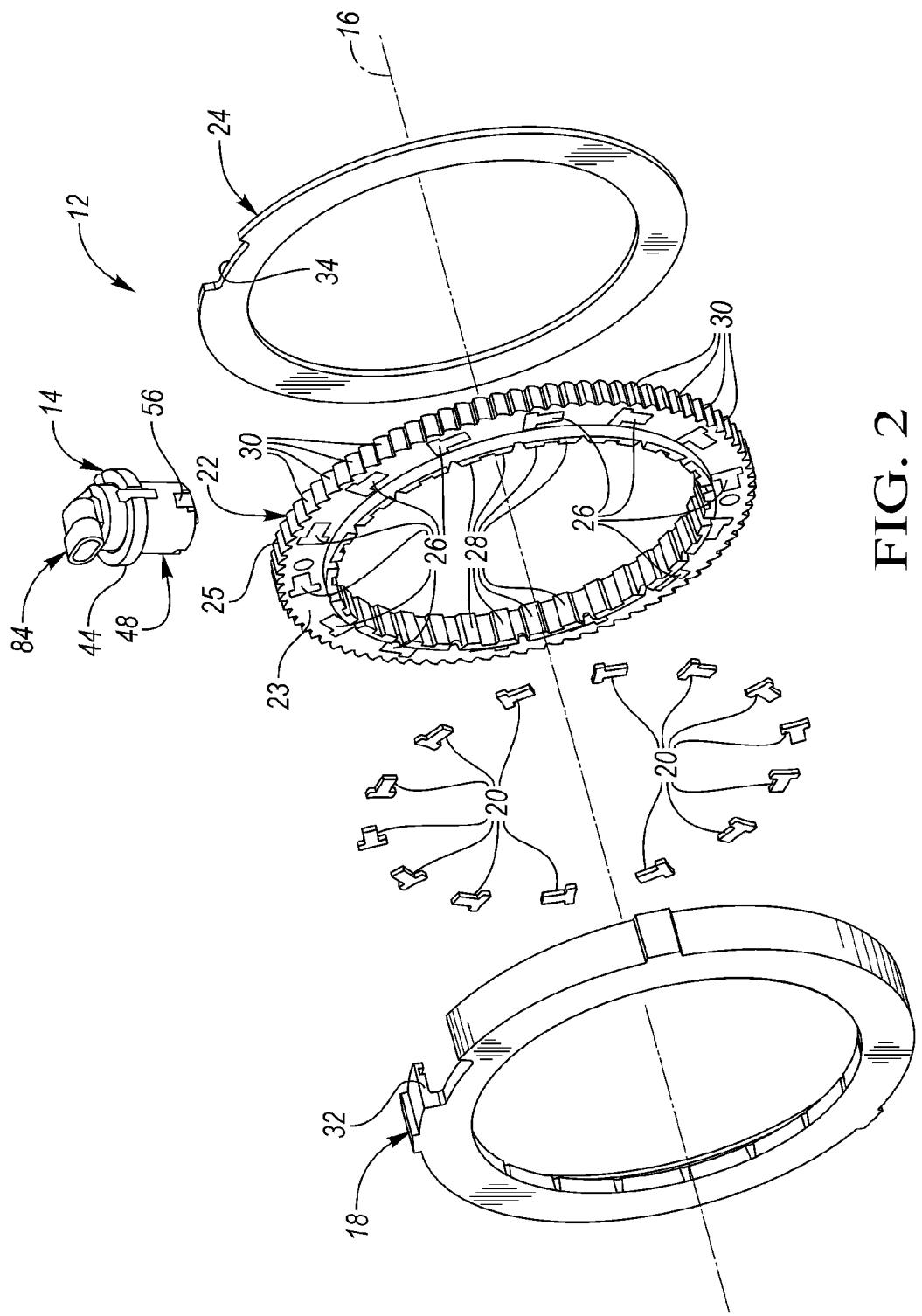
FIG. 2 is an exploded, perspective view of the assembly and component of FIG. 1.
Figure 3:
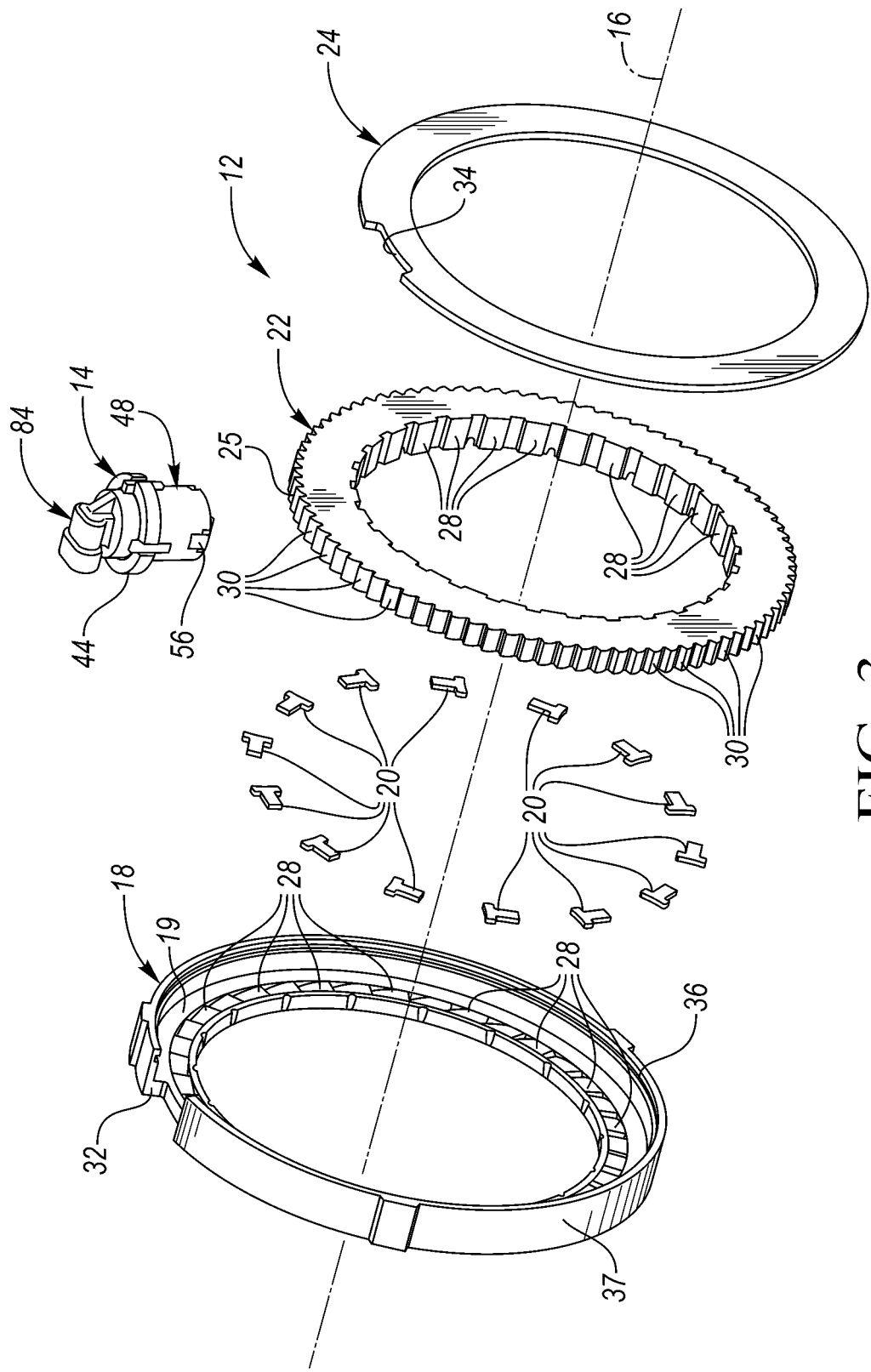
FIG. 3 is a view of the assembly and component similar to the view of FIG. 2 but from a different angle.

Referring now to FIGS. 1-3, the transmission 10 also includes a controllable coupling assembly, generally included at 12, which, in turn, includes first and second coupling members, 18 and 22, respectively, mounted for rotation relative to one another about a rotational axis 16. The first coupling member 18 has a first coupling face 19 oriented to face axially in a first direction with respect to the axis 16 and the second coupling member 22 has a second coupling face 23 oriented to face axially in a second direction opposite the first direction with respect to the axis 16. The second coupling member 22 also has a third coupling face 25 oriented to face radially with respect to the axis 16 and having a set of locking formations or teeth 30 formed therein. The teeth 30 are preferably ferromagnetic or magnetic teeth 30.

The coupling assembly 12 also includes a set of forward locking elements or struts 20 which are received within angularly spaced pockets 26 formed in the face 23 of the coupling member 22. The coupling member 22 has a set of splines 28 formed on its inner diameter for drivingly engaging a drive or driven member (not shown) for rotation about the axis 16.

The assembly 12 also includes a locking ring or plate, generally indicated at 24, for insertion into an annular groove 36 of an axially extending wall 37 of the coupling member 18 to hold the coupling members 18 and 22 together. The locking plate 24 has a circumferential cutout 34 which coincides or is aligned with a circumferential cutout 32 provided in the wall 37 of the member 18 when the plate 24 is inserted into the groove 36. This feature allows a locking element or strut 52 of the component 14 to engage the teeth 30 of the member 22 as shown in FIGS. 4 and 5.

The housing part or housing 48 has an outer coupling face 49 (FIG. 5) in close-spaced opposition to the coupling face 25 of the member 22 when the members 18 and 22 are joined and assembled together by the locking ring 24 and after insertion of the component 14 into the bore 41 of the case 40.

The outer coupling face 49 of the housing part 48 has a single, T-shaped recess or pocket 51. The recess 51 defines a load-bearing first surface shoulder 53. The coupling face 25 of the member 22 has a plurality of reverse notches or teeth 30. Each tooth of the teeth 30 defines a load-bearing second surface or shoulder 31.

Figure 4:
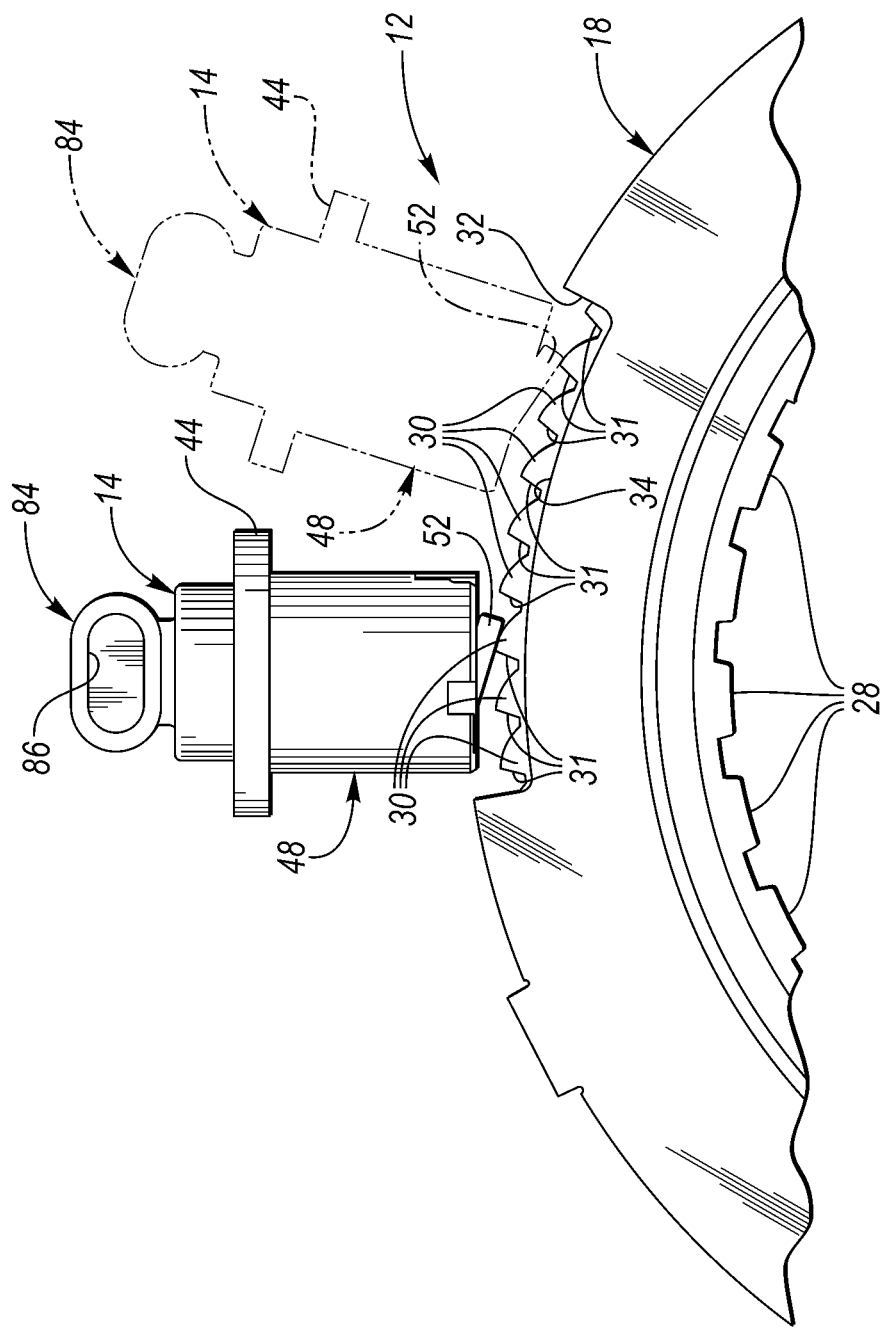
FIG. 4 is an enlarged side view, partially broken away, of the assembly and component of FIG. 1 together with a second electromechanical component in phantom with locking elements of the components partially extended towards locking formations of a coupling member of the assembly.

The locking strut or element 52 is capable of extending between the coupling faces 25 and 49 of the member 22 and the part 48, respectively, between coupling and uncoupling positions when the assembly 12 and case 40 are assembled together as is shown in FIGS. 4 and 5.

The element 52 may comprise a ferromagnetic locking element or strut movable between first and second positions. The first position (i.e. coupling position) is characterized by abutting engagement of the locking element 52 with the load-bearing surface or shoulder 31 of one of the teeth 30 and the shoulder 53 of the pocket 51 formed in an end wall of the housing part 48. The second position (i.e. non-coupling position) is characterized by non-abutting engagement of the locking element 52 with a load-bearing shoulder 31 of at least one of the teeth 30 and the end wall of the housing part 48.

The electromechanical component or apparatus (i.e. SSI) 14 includes the housing part 48 which has a closed axial end including the end wall. The end wall has the outer coupling face 49 with the single pocket 51 which defines the load-bearing shoulder 53 which is in communication with an inner face of the end wall. The housing part 48 may be a metal (such as aluminum) injection molded (MIM) part.

The apparatus 14 also includes an electromagnetic source, including at least one excitation coil 62 which is at least partially surrounded by a skirt of the housing part 48.

Electrical insulated wiring 64 supplies electrical power to the coil 62 from a power source located outside the hot oil environment. The wiring 64 extends from the coil 62, through a hole 65 (FIG. 5) formed through an end seal 82, through a cavity 86 formed through an overmold 84 and to a solenoid controller.

The strut 52 is retained within the pocket 51 by a clevis-shaped retainer 50. The strut 52 is movable outwardly from the pocket 51 to its extended, coupling position characterized by abutting engagement of the strut 52 with a load-bearing surface or shoulder 31 of one of the teeth 30.

Figure 7:
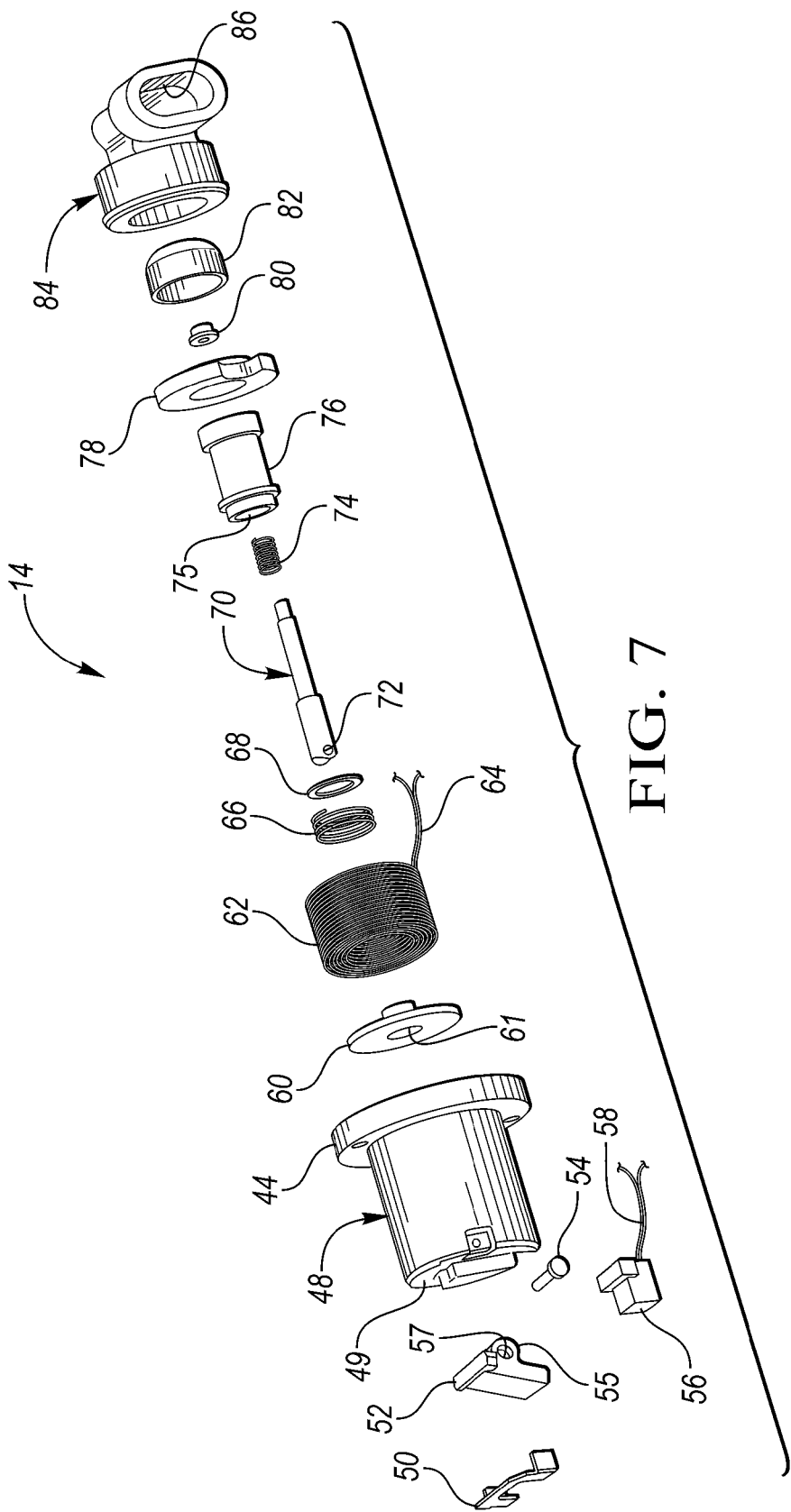
FIG. 7 is an exploded, perspective view of the electromechanical component.

The apparatus 14 also includes a reciprocating plunger, generally indicated at 70, arranged concentrically relative to the at least one excitation coil 62 and is axially movable when the at least one excitation coil 62 is supplied with current via the wires 64. The coil 62 is wound or located about an actuator core or armature 76 and is potted between plates 60 and 78. The armature 76 is also axially movable upon coil excitation. The plate 60 abuts against the inner face of the housing end wall. The plunger 70 extends through a hole 61 (FIG. 7) formed through the plate 60 and is connected at its leading end 72 to the element 52 to move the element 52 between its coupling and uncoupling positions. The plunger 70 also extends through an aperture 75 formed through the armature 76. The opposite end of the plunger 70 has a locking nut or cap 80 positioned thereon which limits movement of the plunger 70 in the aperture 75 towards the teeth 30 by abutting against the lower surface of an annular spacer 68 which abuts against the lower surface of the armature 76.

The element 52 is pivotally connected to the apertured leading end 72 of the plunger 70 wherein the plunger 70 pivotally moves the element 52 within the pocket 51 in response to reciprocating movement of the plunger 70 which, in turn, moves axially in response to reciprocating movement of the armature 76.

The apparatus 14 also preferably includes a return spring 66, which extends between the plate 60 and a shoulder in the outer surface of the actuator core or armature 76, to return the plunger 70 and the armature 76 to their home position when the coil 62 is de-energized, thereby returning the element 52 to its uncoupling position. The apparatus 14 also includes a spring 74 which urges the plunger 70 to move the element 52 towards its coupling position. In other words, the biasing member or spring 66, urges the plunger 70 via the armature 76 to a return position which corresponds to its uncoupling position of the element 52 while the biasing member or spring 66 urges the plunger 70 and its connected element 52 to its coupled position.

The housing part 48 and/or the plate 78 may have holes (not shown) to allow oil to circulate within the housing part 48. Preferably, the at least one coil 62, the housing part 48, the armature 76 and the plunger 70 comprise a low profile solenoid. The locking element 52 may be a metal (such as aluminum) injection molded (i.e. MIM) strut.

The element 52 includes at least one and, preferably, two projecting leg portions 55 which provide an attachment location for the leading end 72 of the plunger 70. Each leg portion 55 has an aperture 57. The apparatus 14 further comprises a pivot pin 54 received within each aperture 57 and the aperture leading end 72 to allow rotational movement of the element 52 in response to reciprocating movement of the plunger 70 wherein the leading end 72 of the plunger 70 is connected to the element 52 via the pivot pin 54.

Preferably, each aperture 55 is an oblong aperture which receives the pivot pin 54 to allow both rotation and translational movement of the element 52 in response to reciprocating movement of the plunger 70. Each locking strut 52 may comprise any suitable rigid material such as ferrous metal, (i.e. steel).

The component 14 also includes a magnetic field speed sensor or device 56 which may comprise a differential Hall-effect device which senses speed of the teeth 30 as they rotate past the sensor 56. The teeth 30 may carry or support a rare-earth, automotive grade, magnet or pellet (not shown) which may be embedded in a hole formed in the outer surface of the teeth. In that case, the teeth 30 may be non-ferrous teeth such as aluminum teeth. Alternatively, and preferably, the teeth 30 are ferromagnetic teeth.

The device 56 is typically back-biased, has two wires 58 (FIG. 7) and provides a current output based on speed of rotation of the teeth 30 past the sensor 56. The device 56 accurately detects the speed with a single output (i.e., current output). The device 56 is preferably mounted adjacent to the pocket 51 and the wires 58 extend through the aperture 61 formed in the plate 60. The wires 58 and the wires 64 of the coil 62 are coupled to the solenoid controller which, in turn, is coupled to a main controller to supply drive signals to the coil 62 in response to control signals from the main controller. The device 56 may be held in place by fasteners or by an adhesive so that a side surface of the device 56 is in close proximity to a side surface of the strut 52 in the uncoupling position of the strut 52.

The sensor 56 is typically back-biased when the teeth 30 are ferromagnetic and typically includes a Hall sensor or sensing element mounted on a circuit board on which other electronics or components are mounted, as is well-known in the art. The sensor 56 is preferably back-biased in that it includes a rare-earth magnet which creates a magnetic flux or field which varies as the teeth 30 move past the sensor 56. The sensor 56 may comprise a back-biased, differential Hall Effect device.

In other words, the device 56 is preferably a back-biased device wherein the device 56 includes a rare earth pellet or magnet whose magnetic field varies as the teeth 30 move therepast. The variable magnetic field is sensed by the magnetic sensing element of the device 56.

The output signal from the device 56 is a feedback signal which is received by the solenoid controller. By providing feedback, the resulting closed-loop control system provides for true speed operation.

As described above, the number of forward struts (i.e. 14) is greater than the number of reverse struts (i.e. one or two). Also, the number of reverse notches is greater than the number of forward notches. In this situation, there is a possibility of a coupling assembly such as the coupling assembly 12 to enter a "lock-lock" condition wherein the transitional backlash (i.e., distance the clutch can move between forward and reverse directions) is extremely low. This results in the locking elements not being allowed to drop out of their coupling positions upon command.

As described and claimed in U.S. patent application Ser. No. 14/675,850 filed on the same day as this application and having the same assignee, in order to avoid the above-described problem, the number of reverse struts and notches and the number of forward struts and notches are chosen so that the forward backlash is a non-zero integer multiple (i.e. "N") of the reverse backlash and the forward pockets are uniformly angularly spaced about the axis 16. The following is a table of 36 entries wherein only entries 11, 14 and 15 do not satisfy the above criteria.

| Entry | N | Reverse Notches | Reverse Struts | Reverse Backlash | Forward Notches | Forward Strut Sets | Forward Backlash | Transitional Backlash |
|---|---|---|---|---|---|---|---|---|
| 1 | 2 | 79 | 1 | 4.556962 | 79 | 2 | 2.278481 | 1.139241 |
| 2 | 2 | 77 | 1 | 4.675325 | 77 | 2 | 2.337662 | 1.168831 |
| 3 | 3 | 80 | 1 | 4.5 | 80 | 3 | 1.5 | 0.75 |
| 4 | 3 | 79 | 1 | 4.556962 | 79 | 3 | 1.518987 | 0.759494 |
| 5 | 3 | 77 | 1 | 4.675325 | 77 | 3 | 1.558442 | 0.779221 |
| 6 | 3 | 76 | 1 | 4.736842 | 76 | 3 | 1.578947 | 0.789474 |
| 7 | 3 | 74 | 1 | 4.864865 | 74 | 3 | 1.621622 | 0.810811 |
| 8 | 3 | 73 | 1 | 4.931507 | 73 | 3 | 1.643836 | 0.821918 |
| 9 | 3 | 71 | 1 | 5.070423 | 71 | 3 | 1.690141 | 0.84507 |
| 10 | 3 | 70 | 1 | 5.142857 | 70 | 3 | 1.714286 | 0.857143 |
| 11 | 3 | 62 | 1 | 5.806452 | 62 | 3 | 1.935484 | 0.967742 |
| 12 | 3 | 61 | 1 | 5.901639 | 61 | 3 | 1.967213 | 0.983607 |
| 13 | 3 | 59 | 1 | 6.101695 | 59 | 3 | 2.033898 | 1.016949 |
| 14 | 3 | 58 | 1 | 6.206897 | 58 | 3 | 2.068966 | 1.034483 |
| 15 | 3 | 56 | 1 | 6.428571 | 56 | 3 | 2.142857 | 1.071429 |
| 16 | 3 | 55 | 1 | 6.545455 | 55 | 3 | 2.181818 | 1.090909 |
| 17 | 3 | 53 | 1 | 6.792453 | 53 | 3 | 2.264151 | 1.132075 |
| 18 | 3 | 52 | 1 | 6.923077 | 52 | 3 | 2.307692 | 1.153846 |
| 19 | 1 | 79 | 2 | 2.278481 | 79 | 2 | 2.278481 | 1.139241 |
| 20 | 1 | 77 | 2 | 2.337662 | 77 | 2 | 2.337662 | 1.168831 |
| 21 | 1 | 79 | 3 | 1.518987 | 79 | 3 | 1.518987 | 0.759494 |
| 22 | 1 | 80 | 3 | 1.5 | 80 | 3 | 1.5 | 0.75 |
| 23 | 1 | 79 | 3 | 1.518987 | 79 | 3 | 1.518987 | 0.759494 |
| 24 | 1 | 77 | 3 | 1.558442 | 77 | 3 | 1.558442 | 0.779221 |
| 25 | 1 | 76 | 3 | 1.578947 | 76 | 3 | 1.578947 | 0.789474 |
| 26 | 1 | 74 | 3 | 1.621622 | 74 | 3 | 1.621622 | 0.810811 |
| 27 | 1 | 73 | 3 | 1.643836 | 73 | 3 | 1.643836 | 0.821918 |
| 28 | 1 | 71 | 3 | 1.690141 | 71 | 3 | 1.690141 | 0.84507 |
| 29 | 1 | 70 | 3 | 1.714286 | 70 | 3 | 1.714286 | 0.857143 |
| 30 | 1 | 61 | 3 | 1.967213 | 61 | 3 | 1.967213 | 0.983607 |
| 31 | 1 | 59 | 3 | 2.033898 | 59 | 3 | 2.033898 | 1.016949 |
| 32 | 1 | 58 | 3 | 2.068966 | 58 | 3 | 2.068966 | 1.034483 |
| 33 | 1 | 56 | 3 | 2.142857 | 56 | 3 | 2.142857 | 1.071429 |
| 34 | 1 | 55 | 3 | 2.181818 | 55 | 3 | 2.181818 | 1.090909 |

-continued

| Entry | N | Reverse Notches | Reverse Struts | Reverse Backlash | Forward Notches | Forward Strut Sets | Forward Backlash | Transitional Backlash |
|---|---|---|---|---|---|---|---|---|
| 35 | 1 | 53 | 3 | 2.264151 | 53 | 3 | 2.264151 | 1.132075 |
| 36 | 1 | 52 | 3 | 2.307692 | 52 | 3 | 2.307692 | 1.153846 |

General Advantages

Wiring is outside the transmission.

Eliminates the difficulty in routing lead wires from the clutch around rotating parts to the bulk head inside the box.

Does not impact the number of wires passing through the bulk head connector.

Coils are potted, leads are over molded, connector is external, completely segregated from the hot oil environment which prevents:

Long term embrittlement of connector and wire insulation from hot oil exposure;

Eliminates the possibility of contamination in oil shorting the circuit to power; and Vibration failures are greatly reduced (potted and over molded).

High Power Density—every surface of the inner and outer race is used. The radial surfaces are for reverse and the planar surfaces are for $1^{st}$ gear. They are independent and do not compete for the same real estate in the races. The concentric design competes for radial cross section and co-planar designs add a PM race. The largest possible strut/cam geometry can be used in a smaller package. This increases the power density of the clutch.

Using the SSI 14 as a common electro-mechanical component.

Tend to make it a high volume commodity thus reducing cost.

Streamlines design, validation, and manufacturing—one and done approach.

Better resource allocation. Engineering can focus on clutch design without the burden of designing a new electro-mechanical solution for each unique application.

Eliminate the slide plate and failure modes associated with the slide plate.

Traditional MD approach—no concentric, co-planar design. Tried and true approach.

Cost competitive—highest power density, 2 races, and an across the board approach for controls using the SSIs 14.

Reduction of partial engagements.

The SSI 14 strut 52 turns on faster than a hydraulic design using a slide plate.

The SSI 14 can be turned on closer to the sync point when doing a rolling forward reverse shift because it takes only 20 ms or less to fire on. No hydraulic delay or temperature effects.

Soft turn off capable reduces impact loads when turning off

No special driver is required. The SSI 14 can fire initially and can be PWMed down to hold on. The higher pulse is to overcome a return spring designed for a 20 g impact.

NVH Advantages—Maximizing cams is great approach to reducing backlash. Many more cams can be formed into the race in the radial direction as opposed to the planar direction. Using the SSI 14 in the radial direction takes advantage of this feature.

Usually there is one outer race where the forward and reverse flanks of a spline are the path to ground. This design splits the paths. There is no backlash in the reverse direction as the path passes through a press fit SSI 14 into the case 40. The SSI 14 only reacts reverse torque. The outer race for the passive clutch conversely only sees forward reaction torque. The result is a system where the clutch does not travel through an external lash. The drive side spline stays on the drive side and the reverse drive path is in a press fit SSI 14. This reduces tick/clunk in the splines. A rubber washer/spring clip can be added to the coast side of the spline to keep the spline engaged with the case at all times. It never experiences reverse torque.

Advantages Over Hydraulic

Temperature insensitive.

Faster reaction time with small tolerance (20 ms or less).

Much less energy to operate over life of application.

Easier to route wires outside of box compared to packaging worm trails.

Easy for diagnostic—software maintenance loop with a trickle voltage can measure resistance for temperature, continuity, or a short instantly setting a code.

Contamination insensitive

Advantages of Two Springs

If the armature 76 was directly connected to the strut 52 with a single return spring, a constant high current would have to be applied to ensure the device turns ON. The lowest stroking force occurs initially at the highest gap when the armature 76 is in the OFF position. If the armature 76 was directly attached to the strut 52 and the strut 52 was in between notches or teeth 30, a high current would have to be held to ensure the device would always stroke to ON eventually. The cam plate 22 would have to rotate so the strut 52 could drop in. So a consistently high current would have to be maintained as long as the solenoid 14 was ON. This is a problem. The solenoid 14 could overheat using this approach. The solution is to use two springs 66 and 76, an actuator core or armature 76, and a second internal piston called the plunger 70 that attaches to the strut 52 via a clevis connection. In this arrangement, the armature 76 always strokes ON and travels the full 3 mm closing the gap independent of the position of the strut 52 relative to the cams or teeth 30. The forces keeping the armature 76 in the ON position increase by a magnitude when the gap is closed. The armature 76 pushes the second spring 74 that pushes the plunger 70 attached to the strut 52.

Once the armature 76 strokes the 3 mm, the current can be dropped to a holding current that is a fraction of the initial pulse current. The strut 52 is loaded by the second spring 74 in the apply direction. If the strut 52 is in between cams or teeth 30, there is a second spring force pushing the strut 52 into the ON position as soon as the cam plate 22 rotates. The armature 70 is now independent of strut position and can be PWMed.

If one used a single spring in a tooth butt condition, the armature 76 would only stroke 1.3 mm and stop with a force of about 2 lbs. In a two-spring system the armature 76 always strokes the full 3 mm in 20 ms allowing the current to drop to a holding current. The second spring 74 applies the force to exit tooth butt.

Advantages of Speed Sensor with the Component (i.e. SSI)

The prior art has a speed sensor that passes through the outside of the outer race of the clutch to sense the speed of the inner race. It was presumed that it is for the non-sync reverse shift when rolling in the forward direction.

At least one embodiment of the present invention provides the structure for a speed sensor chip set. It is possible to pot in a speed sensor chip set right into the SSI 14. This has the advantage of flexing the structure of the SSI 14 to not only lock the inner race to ground in reverse, but also to sense the inner race speed all in the same part. This would eliminate the stand alone speed sensor, case machining and clutch machining to accommodate the stand alone speed sensor. This is a significant cost save.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. An electronic vehicular transmission comprising:
  a transmission case having an environment hostile to electrical components;
  a coupling member supported for rotation within the environment about a rotational axis, the coupling member having a coupling face oriented to face radially with respect to the axis and having a set of locking formations; and
  an electromechanical component capable of operating in the environment, the component including a mechanical locking element, at least one excitation coil and electrical wiring to supply electrical power to the at least one excitation coil from a power source outside the environment, the component being mounted to and extending into the environment of the case so that the locking element is in close-spaced opposition to the coupling face and the wiring is segregated from the environment to resist long-term, hot temperature embrittlement and fragmentation of insulation on the wiring, the locking element being movable across a gap towards the coupling face to a coupling position in response to the at least one excitation coil receiving electrical power, the locking element abuttingly engaging one of the locking formations to prevent rotation of the coupling member in one direction about the axis in the coupling position.

2. The transmission as claimed in claim 1, wherein the at least one excitation coil is potted to segregate the at least one excitation coil from the environment.

3. The transmission as claimed in claim 1, further comprising an overmolded connector mounted on the component, the wiring extending through the connector from outside the environment to the at least one excitation coil, the connector being located outside the environment to resist hot temperature, long-term embrittlement and fragmentation of the connector.

4. An electronic vehicular transmission comprising:
  a transmission case having an environment hostile to electrical components;
  a controllable coupling assembly including first and second coupling members mounted for rotation relative to one another about a rotational axis, the first coupling member having a first coupling face oriented to face axially in a first direction with respect to the axis and the second coupling member having a second coupling face oriented to face axially in a second direction opposite the first direction with respect to the axis, the second coupling member having a third coupling face oriented to face radially with respect to the axis and having a set of locking formations; and
  an electromechanical component capable of operating in the environment, the component including a mechanical locking element, at least one excitation coil and electrical wiring to supply electrical power to the at least one excitation coil from a power source outside the environment, the component being mounted to and extending into the environment of the case so that the locking element is in close-spaced opposition to the third coupling face and the wiring is segregated from the environment to resist long-term, hot temperature embrittlement and fragmentation of insulation on the wiring, the locking element being movable across a gap toward the third coupling face to a coupling position in response to the at least one excitation coil receiving electrical power, the locking element abuttingly engaging one of the locking formations to prevent rotation of the second coupling member in one direction about the axis in the coupling position.

5. The transmission as claimed in claim 4, wherein the at least one excitation coil is potted to segregate the at least one excitation coil from the environment.

6. The transmission as claimed in claim 4, further comprising an overmolded connector mounted on the component, the wiring extending to the connector from outside the environment to the at least one excitation coil, the connector being located outside the environment to resist hot temperature, long-term embrittlement and fragmentation of the connector.

7. A coupling and control assembly comprising:
  a coupling member supported for rotation about a rotational axis, the coupling member having a coupling face oriented to face radially with respect to the axis and having a set of locking formations; and
  an electromechanical component including a mechanical locking element, at least one excitation coil and electrical wiring to supply electrical power to the at least one excitation coil from a power source, the component being positioned relative to the coupling member so that the locking element is in close-spaced opposition to the coupling face and the wiring is segregated from the coupling member, the locking element being movable across a gap towards the coupling face to a coupling position in response to the at least one excitation coil receiving electrical power, the locking element abuttingly engaging one of the locking formations to prevent rotation of the coupling member in one direction about the axis in the coupling position.

8. The assembly as claimed in claim 7, wherein the at least one excitation coil is potted to segregate the at least one excitation coil from the coupling member.

9. The assembly as claimed in claim 7, further comprising an overmolded connector mounted on the component, the wiring extending through the connector to the at least one excitation coil.

* * * * *